United States Patent

Aritomi et al.

Patent Number: 5,177,156
Date of Patent: Jan. 5, 1993

[54] PROCESS FOR PRODUCING SILANE-MODIFIED POLYPHENYLENE ETHER AND THERMOPLASTIC RESIN COMPOSITION CONTAINING THE SAME

[75] Inventors: Mitsutoshi Aritomi; Haruo Ohmura; Hiroshi Nakano; Michiharu Kihira; Yusuke Arashiro; Fumiyoshi Yamada; Shinako Mori; Fumiyo Ikehata, all of Mie, Japan

[73] Assignee: Mitsubishi Petrochemical Co., Ltd., Tokyo, Japan

[21] Appl. No.: 701,910

[22] Filed: May 17, 1991

[30] Foreign Application Priority Data

| | | |
|---|---|---|
| May 17, 1990 [JP] | Japan | 2-125388 |
| May 30, 1990 [JP] | Japan | 2-138594 |
| Jul. 17, 1990 [JP] | Japan | 2-187219 |
| Jul. 17, 1990 [JP] | Japan | 2-187220 |
| Sep. 17, 1990 [JP] | Japan | 2-268290 |

[51] Int. Cl.$^5$ .............................. C08G 65/48
[52] U.S. Cl. ........................ 525/393; 525/100; 525/390; 525/396; 525/420; 525/437
[58] Field of Search ............ 525/393, 396, 534

[56] References Cited

U.S. PATENT DOCUMENTS

| | | | |
|---|---|---|---|
| 3,417,053 | 12/1968 | Chalk | 525/393 |
| 4,551,156 | 11/1985 | Li | 525/393 |

*Primary Examiner*—Harold D. Anderson
*Attorney, Agent, or Firm*—Sughrue, Mion, Zinn Macpeak & Seas

[57] ABSTRACT

A process for producing a terminal-modified polyphenylene ether represented by formula (III):

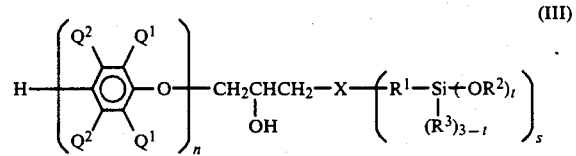

wherein $Q^1$ represents a halogen atom, a primary of secondary alkyl group, a phenyl group, an aminoalkyl group, a hydrocarbon oxy group, or a halo-hydrocarbon oxy group; $Q^2$ represents a hydrogen atom, a halogen atom, a primary or secondary alkyl group, a phenyl group, a haloalkyl group, a hydrocarbon oxy group, or a halo-hydrocarbon oxy group; n represents an integer of at least 10; X represents an oxygen atom or a nitrogen atom;

$R^1$ represents an alkylene group having from 1 to 12 carbon atoms; $R^2$ and $R^3$ each represents a hydrocarbon group having from 1 to 6 carbon atoms; s represents 1 when X is an oxygen atom, or 2 when X is a nitrogen atom; and t represents an integer of from from 1 to 3, which comprises reacting a polyphenylene ether represented by formula (I):

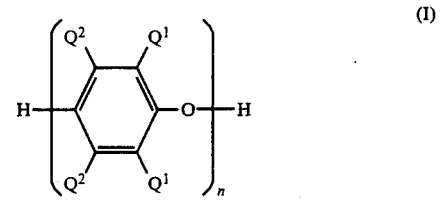

wherein $Q^1$, $Q^2$, and n are as defined above, with a compound represented by formula (II):

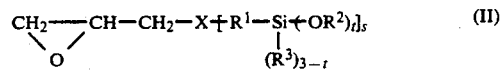

wherein X, $R^1$, $R^2$, $R^3$, s, and t are as defined above; a process for producing an alkoxysilylated polyphenylene ether represented by formula (V):

(Abstract continued on next page.)

(V)

wherein $Q^1$, $Q^2$, and n are as defined above; $R^{11}$ represents a bond or an alkylene group having from 1 to 12 carbon atoms; $R^{12}$ and $R^{13}$ each represents a hydrocarbon group having from 1 to 6 carbon atoms; and m represents an integer of from 1 to 3, which comprises reacting a polyphenylene ether represented by formula (I) shown above with a compound represented by formula (IV):

(IV)

wherein $R^{11}$, $R^{12}$, $R^{13}$, and m are as defined above; and Y represents a halogen atom;

and a thermoplastic resin composition comprising the modified polyphenylene ether of formula (III) or (IV) with a saturated polyester, a polyamide, or a modified olefin resin.

6 Claims, 2 Drawing Sheets

PROCESS FOR PRODUCING SILANE-MODIFIED POLYPHENYLENE ETHER AND THERMOPLASTIC RESIN COMPOSITION CONTAINING THE SAME

FIELD OF THE INVENTION

This invention relates to a process for producing a modified polyphenylene ether (hereinafter abbreviated as PPE) in which a terminal phenolic hydroxyl group of PPE is modified with a compound having an alkoxysilyl group (hereinafter referred to as terminal-modified PPE or alkoxysilylated PPE) and to a high performance thermoplastic resin composition containing such a terminal-modified PPE.

BACKGROUND OF THE INVENTION

PPE is an extremely useful thermoplastic resin having excellent heat resistance, mechanical characteristics, electrical characteristics, water resistance, acid resistance, alkali resistance, and self-extinguishing properties and has been broadening its application as engineering plastic material in the field of automobile parts and electrical and electronic parts. However, this resin has a high melt viscosity due to its high glass transition point resulting in poor moldability and poor impact resistance, for example, for use as engineering plastic.

To overcome these disadvantages, PPE has been used as a polymer blend with polyolefin resins or other engineering plastics. However, PPE has been found to have poor compatibility with other polymer resins and plastics, such that resulting polymer blends provide resin compositions which are brittle and which have reduced mechanical strength and impact strength, such that these resin blends are found to be unacceptable for practical use. Additionally, most solubilizers thus for proposed for improving compatibility of PPE with other polymers are graft or block copolymers of PPE and the polymer to be blended. In one feasible method for synthesizing such copolymers, the terminal phenolic hydroxyl group of PPE is made to react with a functional group in the other polymers. However, functional groups capable of reacting with the terminal phenolic hydroxyl group are of limited type, resulting in a narrow range of application of such a technique.

Many terminal-modified PPE resins having improved reactivity have hitherto been proposed. For example, JP-W-62-500456, JP-W-63-500803 and JP-W-63-503391 (the term "JP-W" as used herein means an "unexamined published international patent application") disclose some examples of hydroxyalkylated PPE. However, the processes for producing these modified PPE require multi-stage reactions, some of which are high-temperature melt reactions which are not commercially practical. Even where modification can be achieved under relatively mild reaction conditions, expensive acid chlorides must be used. Further, JP-A-63-128021 (the term "JP-A", as used herein means an "unexamined published Japanese patent application") discloses a process, in which PPE is reacted with ethylene oxide or propylene oxide to introduce a hydroxyalkyl group to the end group thereof. This process still involves several unsolved problems such that a reaction under high pressure is required and, also, control of number of moles of ethylene oxide or propylene oxide added is difficult, resulting in the failure of obtaining products of uniform quality. JP-W-63-503392 teaches a process for introducing an alkoxysilyl group into a PPE skeleton, in which vinyltrimethoxysilane is grafted to PPE in chlorobenzene in the presence of a radical initiator. This process has difficulty in controlling the position at which an alkoxysilyl group is introduced and the amount of an alkoxysilyl group to be introduced.

Although PPE with or without a substituent(s) at the phenylene ring thereof, and especially poly(2,6-dimethyl-1,4-phenylene ether) has excellent heat resistance and mechanical strength and is useful as engineering plastic, it is known to be unsuitable for molding (by injection molding, etc.) due to its high melt viscosity. Additionally, its impact strength and solvent resistance are also not suitable for use as engineering plastic in various applications. As mentioned above, it has been attempted to compensate for such insufficiencies of a resin material, when used alone, by incorporating such a resin material with other resin materials. For example, a PPE composition with improved moldability (which comprises PPE and polystyrene exhibiting compatibility with PPE and satisfactory moldability) has been widely used. However, both PPE and polystyrene have insufficient solvent resistance, as well as does a blend thereof.

Saturated polyesters (e.g., polybutylene terephthalate) have been widely employed as engineering plastics in the field of automobile parts and electric or electronic parts because of their excellent mechanical and electrical properties. However, these resins suffer from the problems of significant molding shrinkage and linear expansion and also exhibit poor thermal stability under high load, and therefore have limited utility. Incorporation of reinforcements, such as glass fibers, has been attempted to overcome these problems, but the resulting molded articles have deteriorated appearance and thus have limited application. Hence, a composition which compensates for unfavorable properties inherent in PPE and a saturated polyester, while retaining the respective favorable properties, would be an excellent resin material with broad applications and high industrial significance. To this effect, a composition obtained by mere melt-mixing of PPE and a saturated polyester was proposed, as described in JP-B-51-21664 (the term "JP-B" as used herein means an "examined published Japanese patent application"), JP-A-49-50050, JP-A-49-75662, and JP-A-59-159847.

Polyamides have been widely employed engineering plastics because of their suitable heat resistance, solvent resistance, and moldability. However, polyamide resins are limited in application due to their inferiority in dimensional stability, hygroscopicity, thermal deformation resistance under high load and impact resistance. Hence, a composition which compensates for unfavorable properties inherent in PPE and a polyamide, while retaining the respective favorable properties, would be an excellent resin material with broad application and high industrial significance. To this effect, a composition obtained by mere melt-mixing of PPE and a polyamide was proposed as disclosed in U.S. Pat. Nos. 3,379,792 and 4,338,421, JP-B-45-997, and JP-B-59-41663. However, such polyamide-PPE blends suffer from significant problems, as described below.

Further, olefin resins are also widely utilized in production of a variety of molded articles because of their moldability, organic solvent resistance, low specific gravity, and cheapness. However, heat resistance of olefin resins is not so high, which has been a hindrance to application as engineering plastic. Hence, a composition which compensates unfavorable properties inherent to PPE and an olefin resin while retaining the respective favorable properties would be an excellent resin material with broadened application and extremely high industrial significance. To this effect, a composition obtained by merely melt-mixing both resins was proposed as disclosed in JP-B-42-706. However, such olefin resin-PPE blends suffer from significant problems, as described below.

However, these conventional mere blends of PPE and other resins, such as saturated polyesters, polyamides and olefin resins, have the following problems. That is, since PPE has poor compatibility with saturated polyesters or polyamides and is substantially incompatible (due to lack of affinity) with olefin resins, the interface of the two-phase structure has insufficient adhesion so that the two phases substantially do not form a uniform and fine dispersion. Such a polymer blend is apt to undergo delamination under shearing stress on molding, such as injection molding, and the resulting molded articles suffer from the problems of deteriorated appearance or defects formed at the interface of the two phases. More specifically, conventional blending of PPE with a saturated polyester fails to provide a composition commercially suitable in mechanical characteristics (e.g., dimensional precision, heat resistance and rigidity) and physical characteristics (e.g., solvent resistance). Additionally, conventional blending of PPE with a polyamide or an olefin resin fails to provide a composition commercially suitable in mechanical strength and impact resistance.

One general approach taken for solving the above-described problem associated with a polymer blend of PPE and a saturated polyester is to chemically bind both polymers by reacting PPE, modified with a functional group capable of reacting with a saturated polyester, and a saturated polyester by melt-kneading at high temperature to obtain a block or graft copolymer having improved affinity between the two polymer components. In this case, it is necessary to initially add to PPE a functional group that is capable of reacting with a hydroxyl end group or a carboxyl end group of a saturated polyester or an ester unit in the main chain of a saturated polyester. In this regard, many functionalized polyphenylene ethers have hitherto been proposed for obtaining increased reactivity. Examples of functionalized PPE proposed to date include a carboxyl- or carboxylic acid anhydride-functionalized PPE (see JP-A-62-257958, JP-A-63-54427, and JP-W-63-500803), an epoxy-functionalized PPE (see JP-A-62-257958 and JP-W-63-503388), and an alkoxysilyl-functionalized PPE (see JP-W-63-503392); and resin compositions of such a functionalized PPE and various saturated polyesters have been proposed. In many cases, however, use of the conventional functionalized PPE proved insufficient for improving compatibility between PPE and saturated polyesters, and the mechanical characteristics of the resulting compositions also were commercially unsuitable, thus requiring further improvements.

Another general approach taken for solving the above-described problems associated with a polymer blend of PPE and a polyamide is to react PPE modified with a functional group and a polyamide by melt-kneading at high temperature to obtain improved affinity between the two polymer components. For such an approach, many functionalized polyphenylene ethers have hitherto been proposed for obtaining increased reactivity. Examples of proposed functionalized PPE include a carboxyl- or carboxylic acid anhydride-functionalized PPE (see JP-W-62- 500456, JP-A-63-10656, and JP-A-63-54427), an epoxy-functionalized PPE (see JP-A-62-257957 and JP-W-63-503388), an amido or imido-functionalized PPE (see JP-W-63-500803), and an alkoxysilyl-functionalized PPE (see JP-W-63-503392); and resin compositions of such a functionalized PPE and various polyamides have been proposed. In many cases, however, use of the conventional functionalized PPE were still not suitable for improving compatibility between PPE and a polyamide, and the mechanical characteristics of the resulting compositions were commercially unsuitable, such that further improvements were needed.

Another general approach taken for solving the above-described problems associated with a polymer blend of PPE and an olefin resin is to chemically bind both polymers by reacting PPE and an olefin resin, each of which is modified with a functional group capable of reacting with each other by melt-kneading at high temperature to obtain a block or graft copolymer having improved affinity between the two polymer components. Using such an approach, many functionalized polyphenylene ethers have been proposed to date for obtaining increased reactivity. Examples of so far proposed functionalized PPE include a carboxyl- or carboxylic acid anhydride-functionalized PPE (see JP-W-62-500456, JP-A-63-10656, JP-A-63-54427, and JP-A-63-128056), an epoxy-functionalized PPE (see JP-A-62-257957 and JP-W-63-503388), an amido- or imidofunctionalized PPE (see JP-W-63-500803, JP-W-63-503391, and JP-A-61-16963), and an alkoxysilyl-functionalized PPE (see JP-W-63-503392). A number of resin compositions have been suggested that comprise such functionalized PPE's (used as a precursor) and various other resins having a functional group, such as polyamides and saturated polyesters and modified olefin resins. However, such resin compositions have not included a terminal-modified PPE and a modified olefin resin.

SUMMARY OF THE INVENTION

Accordingly, it is an object of the present invention is to provide a terminal-modified PPE which has improved compatibility with other resins, e.g., polyolefin, polyester, polyamide, or other resin polymers, and to provide a process for easily producing such a modified PPE.

Another, object of the present invention is to provide a process for producing a terminal-modified PPE with an alcoholic hydroxyl group and at least one alkoxysilyl group bonded at the terminal end thereof or a terminal-modified PPE with an alkoxysilyl group bonded at the terminal end thereof.

Another object of the present invention is to provide a thermoplastic resin composition excellent in thermal rigidity, dimensional precision, moldability, solvent resistance, and dispersion, which comprises a terminal-modified PPE and a saturated polyester.

A further object of the present invention is to provide a thermoplastic resin composition excellent in thermal rigidity, dimensional precision, moldability, solvent resistance, impact resistance, and dispersion, which comprises a terminal-modified PPE and a polyamide.

A still further object of the present invention is to provide a thermoplastic resin composition excellent in mechanical strength, solvent resistance, heat resistance, dimensional precision, moldability, and dispersion, which comprises a terminal-modified PPE and an olefin resin.

The inventors have conducted extensive investigations and discovered that a terminal-modified PPE can be obtained by modifying a terminal phenolic hydroxyl group of a PPE with a compound containing one alkoxysilyl group and one glycidyl group per molecule or a compound containing one halogen atom and one alkoxysilyl group per molecule with more ease as compared with conventional processes. It has also been found that a thermoplastic resin composition, comprising such a terminal-modified PPE and a saturated polyester, a polyamide, or a hydroxyl-containing olefin resin, satisfies the above-described requirements.

Thus, in one embodiment, the above objects have been met by providing a process for producing a terminal-modified PPE represented by formula (III):

(III)

wherein $Q^1$ represents a halogen atom, a primary or secondary alkyl group, a phenyl group, an aminoalkyl group, a hydrocarbon oxy group, or a halo-hydrocarbon oxy group; $Q^2$ represents a hydrogen atom, a halogen atom, a primary or secondary alkyl group, a phenyl group, a haloalkyl group, a hydrocarbon oxy group, or a halo-hydrocarbon oxy group; n represents an integer of at least 10; X represents an oxygen atom or a nitrogen atom; $R^1$ represents an alkylene group having from 1 to 12 carbon atoms; $R^2$ and $R^3$ each represents a hydrocarbon group having from 1 to 6 carbon atoms; s represents 1 when X is an oxygen atom, or 2 when X is a nitrogen atom; and t represents an integer of from 1 to 3, which process comprises reacting a PPE represented by formula (I):

(I)

wherein $Q^1$, $Q^2$, and n are as defined above, with a compound containing an alkoxysilyl group and a glycidyl group per molecule which is represented by formula (II):

(II)

wherein X, $R^1$, $R^2$, $R^3$, s, and t are as defined above, to produce a terminal-modified PPE of formula (III).

In another embodiment, the above objects of the present invention have been met by providing a process for producing an alkoxysilylated PPE represented by formula (V):

(V)

wherein $Q^1$, $Q^2$, and n are as defined above with respect to formula (III); $R^{11}$ represents a bond or an alkylene group having from 1 to 12 carbon atoms; $R^{12}$ to $R^{13}$ each represents a hydrocarbon group having from 1 to 6 carbon atoms; and m represents an integer of from 1 to 3, which process comprises reacting a PPE represented by formula (I) shown above with a compound containing a halogen atom and one alkoxysilyl group per molecule which is represented by formula (IV):

(IV)

wherein $R^{11}$, $R^{12}$, $R^{13}$, and m are as defined above; and Y represents a halogen atom; to produce an alkoxysilylated PPE of formula (V).

In still another embodiment of the present invention, the above objects have been met by providing a thermoplastic resin composition comprising (A) from about 10 to 90% by weight of a terminal-modified PPE represented by formula (III), shown above, and (B) from about 10 to 90% by weight of a saturated polyester, wherein the composition possesses excellent characteristics inherent in PPE (A) combined with those properties inherent in saturated polyesters (B) (i.e., thermal rigidity, dimensional precision, moldability, solvent resistance, and dispersion) and the composition is useful as a molding material.

In another embodiment of the present invention, the above objects have been met by providing a thermoplastic resin composition comprising (A) from about 10 to 90% by weight of a terminal-modified PPE represented by formula (III) shown above and (C) from about 10 to 90% by weight of a polyamide, which composition possesses excellent characteristics inherent in PPE (A) combined with those properties inherent in polyamide (C) (i.e., mechanical characteristics, moldability, dimensional precision, and solvent resistance) and the composition is also useful as a molding material.

In still another embodiment of the present invention, the above objects of the present invention are not by providing a thermoplastic resin composition comprising (A) from about 10 to 90% by weight of a terminal-modified PPE represented by formula (III), shown above, and (C) from about 10 to 90% by weight of a hydroxyl-containing olefin resin, which composition possesses excellent characteristics inherent in PPE (A) combined with those properties inherent in olefin resin (D) (i.e., mechanical characteristics, moldability, dimensional precision, and solvent resistance) and which composition is useful as a molding material.

DETAILED DESCRIPTION OF THE INVENTION

As compared with unmodified PPE, an alkoxysilyl-modified PPE obtained by the method of the present invention, when blended with other resins (e.g., polybutylene terephthalate, nylon-6, nylon-6,6, and maleic anhydride-grafted polypropylene), reacts with functional groups of the resin blended with (e.g., —NH₃, —COOH) to enhance compatibility among resins and to increase impact strength of the resin composition. A modified PPE obtained by the method of the present invention also can be used as a precursor of graft or block copolymers. Further, a modified PPE obtained by the method of the present invention provides polyphenylene ethers having an increased molecular weight through coupling reaction of the alkoxysilyl group thereof, which are useful for improving adhesion between various resins and inorganic fillers or reinforcing fibers.

Thermoplastic resin compositions according to the present invention comprise the above-described terminal-modified PPE and at least one of a saturated polyester, a polyamide or a hydroxyl-containing olefin resin. Such a composition according to the present invention exhibits properties characteristic of PPE (i.e., heat resistance, mechanical strength and dimensional precision) combined with properties characteristic of saturated polyesters (i.e., mechanical properties, electrical properties and solvent resistance), properties characteristic of polyamides (i.e., solvent resistance and moldability) or properties characteristic of olefin resins (i.e., moldability and organic solvent resistance). Resin compositions according to the present invention have broadened application as components of automobiles and electric and electronic equipment, which have shown more variety and advancement in technique.

PPE which can be used in the present invention includes a homopolymer or a copolymer comprising a structural unit represented by formula (I):

Examples of primary alkyl groups represented by $Q^1$ or $Q^2$ include methyl, ethyl, n-propyl, n-butyl, n-amyl, isoamyl, 2-methylbutyl, n-hexyl, 2,3-dimethylbutyl, 2-, 3- or 4-methylpentyl, and heptyl groups. Examples of secondary alkyl groups as $Q^1$ or $Q^2$ include isopropyl, sec-butyl, 1-ethylpropyl, and 1-methylpentyl groups. $Q^1$ is preferably an alkyl group or a phenyl group and, more preferably, an alkyl group having from 1 to 4 carbon atoms. $Q^2$ is preferably a hydrogen atom.

Preferable phenylene ether homopolymers include a homopolymer comprising a 2,6-dimethyl-1,4-phenylene ether unit. Preferred phenylene ether copolymers include a random copolymer comprising a 2,6-dimethyl-1,4-phenylene ether unit and a 2,3,6-trimethyl-1,4-phenylene ether unit. Many examples of homopolymers or random copolymers that can be used in the present invention are described in patents and the literature (e.g., WO87/07279) which is herein incorporated by reference. Also suitable is a PPE containing a molecular constituting segment for improving such characteristics as molecular weight, melt viscosity and/or impact strength, for example, a PPE having grafted thereto a vinyl monomer (e.g., acrylonitrile and an aromatic vinyl compound (e.g., styrene)) or a polymer (e.g., polystyrene or an elastomer thereof), as are known in the art, (e.g., JP-B-63-60059).

PPE to be used in the present invention can have a molecular weight such that it has an intrinsic viscosity of from about 0.2 to about 0.8 dl/g in chloroform at 30° C.

PPE to be used in the present invention can generally be prepared by oxidative coupling of the above-mentioned monomer(s) by known methods (e.g., U.S. Pat. Nos. 3,306,874, 3,306,875, 3,914,266, and 4,028,341, JP-B-40-30354, JP-B-47-5111, JP-A-56-32523, JP-A-57-44625, JP-A-58-19329, JP-A-60-83185, JP-B-45-23555, etc.). A number of catalyst systems are known for use in oxidative coupling of phenylene ether monomers (e.g., as a copper series catalyst, U.S. Pat. Nos. 3,306,874, 3,306,875, 3,914,266, and 4,028,341; as a manganese series catalyst, JP-B-40-30354, JP-B-47-5111, JP-A-56-32523, JP-A-57-44625, JP-A-58-19329, and JP-A-60-83185; and as a cobalt series catalyst, JP-B-45-23555). Any of the known catalysts can be used in the present invention without any particular limitation. For example, combinations of at least one heavy metal compound of copper, manganese, cobalt, etc. with various other substances can be used.

Compounds of formulae (II) which can be used as a modifying agent for production of the terminal-modified PPE of formula (III) is a compound containing one glycidyl group and one alkoxysilyl group per molecule. Specific examples of such a compound include N-glycidyl-N,N-bis[3-(methyldimethoxysilyl)propyl]-amine, N-glycidyl-N,N-bis[3-(trimethoxysilyl)propyl]amine, 3-glycidyloxypropyl(methyl)dimethoxysilane, 3-glycidyloxypropyltrimethoxysilane, and 3-glycidyloxypropyl(methyl)diethoxysilane, with 3-glycidyloxypropyltrimethoxysilane and 3-glycidyloxypropyl(methyl)diethoxysilane being particularly preferred.

Compounds of formula (IV) which can be used as a modifying agent for production of terminal-modified PPE's of formula (V) according to the present invention include, for example, compounds containing one halogen atom and one alkoxysilyl group per molecule. In formula (IV), the alkylene group as represented by $R^{11}$ can include methylene, ethylene, propylene, and butylene groups. Hydrocarbon groups as represented by $R^{12}$ or $R^{13}$ can include an alkyl group, e.g., methyl or ethyl, and a phenyl group. Halogen atoms as represented by Y can include iodine, chlorine, bromine, and iodine atoms.

Specific examples of preferred compounds represented by formula (IV) are 3-chloropropyl(methyl)diethoxysilane, 3-chloropropyl(methyl)dimethoxysilane, 3-chloropropyltrimethoxysilane, 3-chloropropyltriethoxysilane, 3-chloropropyl(dimethyl)methoxysilane, 2-chloroethyltrimethoxysilane, and 4-chlorobutyltrimethoxysilane.

Terminal-modified PPE's of formula (III) according to the present invention can easily be prepared by reacting a PPE of formula (I) and a compound of formula (II) in an organic solvent in the presence of a basic catalyst.

Alkoxysilylated PPE's of formula (V), according to the present invention, can easily be prepared by reacting a PPE of formula (I) and the compound of formula (IV) in an organic solvent in the presence of a basic catalyst.

Organic solvents which can be used in the preparation of terminal-modified PPE's according to the present invention are preferably capable of dissolving the starting PPE. Specific examples of such organic solvents include aromatic hydrocarbons (e.g., benzene, toluene, and xylene); halogenated aromatic hydrocarbons (e.g., chlorobenzene and dichlorobenzene); halogenated aliphatic hydrocarbons (e.g., chloroform, trichloroethylene, and carbon tetrachloride); and aprotic polar solvents (e.g., N-methyl-2-pyrrolidone and 1,3-dimethyl-2-imidazolidinone). Examples of suitable basic catalysts which can be used according to the present invention include alcoholates (e.g., sodium methoxide and sodium ethoxide); tertiary amines (e.g., benzyldimethylamine, tributylamine, and 1,8-diazabicyclo[5,4,0]-7-undecene (DBU)); and alkali metal hydroxides (e.g., sodium hydroxide and potassium hydroxide).

The reaction between PPE's of formula (I) and compounds of formula (II) can be carried out using about 2 to 50 mols, and preferably about 5 to 20 mols, of a compound of formula (II) per mol of the terminal phenolic hydroxyl group of a PPE of formula (I), about 500 to 1000 parts by weight of an organic solvent per about 100 parts by weight of PPE, and about 1 to 3 parts by weight of a basic catalyst per about 100 parts by weight of PPE.

In carrying out such a reaction, PPE of formula (I) can be dissolved in an organic solvent under heating. After a basic catalyst, dissolved in a small amount of ethanol or methanol, is added to the solution, a compound of formula (II) is added thereto at a temperature of about 50° to 200° C., and heating continued until the reaction is completed.

A reaction between PPE of formula (I) and a compound of formula (IV) can be carried out by using about 1 to 50 mols, and preferably about 2 to 20 mols, of the compound of formula (IV) per mol of the terminal phenolic hydroxyl group of the PPE of formula (I), about 300 to 1000 parts by weight of an organic solvent per about 100 parts by weight of the PPE, and about 1 to 10 parts, and preferably about 1 to 3 parts, by weight of a basic catalyst per about 100 parts by weight of the PPE.

In carrying out such a reaction, PPE of formula (I) can be dissolved in an organic solvent under heating. After a basic catalyst is added to the solution, the compound of formula (IV) is added thereto at a temperature of from room temperature up to the boiling point of the organic solvent used, and the heating is continued with stirring until the reaction is completed.

Thermoplastic resin compositions according to the present invention are described below in greater detail.

Component (A): Terminal-Modified PPE

Terminal-modified PPE which can be used in the present invention can be prepared as described above.

Component (B): Saturated Polyester

Various polyesters can be used as component (B), including thermoplastic polyesters obtained by condensation of a dicarboxylic acid or a lower alkyl ester, acid halide or acid halide derivative thereof and a glycol compound by known methods (e.g., U.S. Pat. Nos. 2,465,319, 3,047,539, 2,720,502, 3,671,487, 2,727,881, 3,953,394, 2,822,348, and 4,128,526).

Examples of suitable aromatic or aliphatic dicarboxylic acids include oxalic acid, malonic acid, succinic acid, glutaric acid, adipic acid, suberic acid, azelaic acid, sebacic acid, terephthalic acid, isophthalic acid, p,p'-dicarboxydiphenylsulfone, p-carboxyphenoxyacetic acid, p-carboxyphenoxypropionic acid, p-carboxyphenoxybutyric acid, p-carboxyphenoxyvaleric acid, 2,6-naphthalenedicarboxylic acid, and 2,7-naphthalenedicarboxylic acid, and mixtures of these carboxylic acids.

Examples of suitable aliphatic glycol compounds include straight chain alkylene glycols having from 2 to 12 carbon atoms (e.g., ethylene glycol, 1,3-propylene glycol, 1,4-butene glycol, 1,6-hexene glycol, and 1,12-dodecamethylene glycol). Examples of suitable aromatic glycol compounds are p-xylene glycol, pyrocatechol, resorcinol, and hydroquinone, and alkyl-substituted derivatives of these glycol compounds. Also included in suitable glycol compounds is 1,4-cyclohexanedimethanol.

Polyesters obtained by ring-open polymerization of lactones (e.g., polypivalolactone and poly($\epsilon$-caprolactone)) are also preferred.

In addition, polyesters capable of forming a liquid crystal in a molten state (called "thermotropic liquid crystal polymer" or "TLCP") are preferred. Polyesters included under this category and available on the market, typically exemplified by "X7G ™" produced by Eastman Kodak Co., "Xydarn ™" produced by Dartco Co., "Econoln ™" produced by Sumitomo Chemical Co., Ltd., and "Vectran ™" produced by Celanese Co.

Of the above-described polyesters as component (B), particularly preferred are polyethylene terephthalate (PET), polybutylene terephthalate (PBT), polynaphthalene terephthalate (PEN), poly(1,4-cyclohexanedimethylene terephthalate) (PCT), and liquid crystal polyesters.

Component (C): Polyamide

Polyamides which can be used in the present invention as component (C) are polymers having a -CONH- bond in the main chain thereof and fusible by heating. Typical examples of such polyamides are nylon-4, nylon-6, nylon-6,6, nylon-4,6, nylon-12, nylon-6,10, and nylon-6,12. Also included polyamides are low crystalline or amorphous polyamides (containing a monomer component such as an aromatic diamine and an aromatic dicarboxylic acid) and transparent nylon resins, and mixtures thereof.

Preferred of these polyamides are nylon-6,6, nylon-6, and amorphous polyamides.

Polyamides to be used in the present invention preferably have a relative viscosity of from 2.0 to 8.0 as measured in 98% concentrated sulfuric acid at 25° C. according to JIS K6810.

Component (D): Hydroxyl-Containing Olefin Resin (1) Olefin Resin

Olefin resins of hydroxyl-containing olefin resins to be used in the present invention include $\alpha$-olefin homopolymers of, e.g., ethylene, propylene, butene or hexene; copolymers comprising two or more of such $\alpha$-olefins; and copolymers comprising such $\alpha$-olefins and other copolymerizable unsaturated monomers. Specific examples of such olefin resins are (extremely) low-density polyethylenes, middle-density polyethylenes, high-density polyethylenes, polypropylenes, ethylene-propylene copolymers, ethylene-vinyl acetate copolymers, ethylene-(meth)acrylic acid copolymers or an ion-cross-linked products thereof, and ethylene-(meth)acrylic ester copolymers, mixtures of these polymers, and graft copolymers of these polymers with maleic anhydride, (meth)acrylic acid, a (meth)acrylic esters, or the like. Also included are olefin resins containing, in addition to the above-enumerated monomer components, a polyunsaturated compound (e.g., a dialkenylbenzene, methyloctadiene and methylhexadiene) as a copolymerizable component.

(2) Introduction of Hydroxyl Group into Olefin Resin

Methods for introducing a hydroxyl group into the above-described olefin resins are not particularly restricted, and any of known techniques disclosed in literatures can be employed (e.g., JP-A-61-85404 and JP-A-61-272217).

For example, a hydroxyl-containing olefin resin can be prepared by a process (i) in which an olefin resin is modified with a compound containing an ethylenically unsaturated bond and a hydroxyl group, e.g., 2-hydroxyethyl acrylate, 2-hydroxyethyl methacrylate, and 2-hydroxypropyl methacrylate, in the presence of a radical generator, e.g., organic peroxides. The amount of a hydroxyl group to be introduced by this process preferably ranges from about 0.01 to 30% by weight, and more preferably from about 0.1 to 10% by weight, in terms of the content of the above compound in the modified olefin resin. If it is less than about 0.01% by weight, no substantial improving effect as is expected can be obtained. If it exceeds about 30% by weight, the resulting composition cannot manifest its mechanical properties to the full.

A hydroxyl-containing olefin resin can also be prepared by a process (ii) in which an ethylenically unsaturated bond of an olefin copolymer containing a polyunsaturated copolymerization component (e.g., a dialkenylbenzene, methyloctadiene, and methylhexadiene) is oxidized with (a) aqueous hydrogen peroxide and an organic acid (e.g., formic acid) through a peracid (b) a permanganate or the like in the presence or absence of an intra-phase transfer catalyst (e.g., quaternary ammonium salts), or (c) aqueous hydrogen peroxide, a permanganate, or the like in the presence of an oxide of osmium, ruthenium, tungsten, selenium, or the like as a catalyst; a process (iii) in which a halogen (e.g., bromine), a hydrogen halide, or sulfuric acid is added to said ethylenically unsaturated bond, and the adduct is then hyrolyzed, or an epoxy group introduced to the ethylenically unsaturated bond through various reactions is hydrolyzed; or a process (iv) in which a compound containing at least one hydroxyl group per molecule, such as thiol compounds (e.g., thioglycerol and thioglycol), is added to the ethylenically unsaturated bond.

The amount of hydroxyl group to be introduced by the processes (ii), (ii) and (iv) is preferably about 1% or more, more preferably about 5% or more, and most preferably about 10% or more, based on the total ethylenically unsaturated bond in the copolymer. If it is less than about 1% by weight, no substantially improved effect can be produced.

In such reactions, the olefin resin is used in most cases in a dissolved or molten state. It may also be used in a swollen state with a solvent. Solvent to be used can be selected preferably from aliphatic, alicyclic or aromatic hydrocarbons and halides thereof; esters having 6 or more carbon atoms; ethers; ketones; carbon disulfide; and mixtures of two or more thereof. The rate of reaction can be 100% or less, and by-products may be present as long as substantial introduction of a hydroxyl group is achieved.

A compounding ratio of component (A) and component (B), (C) or (D) is selected depending on performance properties demanded for the end use of the final product.

Such properties as moldability, mechanical strength, solvent resistance, dimensional precision, and high-temperature rigidity can be adjusted in many cases by selection of components according to their characteristics and selection of the compounding ratio as is known in the art. Nevertheless, cases are often met in which properties conflicting to each other in their manifestation mechanism, such as rigidity and impact strength, are inconsistent with each other. For the sake of practical use, adjustment of properties is generally effected taking suitable balancing of such properties as moldability, mechanical strength, and high-temperature rigidity into consideration. While, accordingly, there is no essential limitation to compounding ratios of components (A) to (D), the following resin compositions are preferred for practical use.

1) Resin composition comprising from about 10 to 90% by weight, particularly from 20 to 80% by weight, of component (A) and from about 10 to 90% by weight, particularly from 20 to 80% by weight, of component (B).

2) Resin composition comprising from about 10 to 90% by weight, particularly from 20 to 80% by weight, of component (A) and from about 10 to 90% by weight, particularly from 20 to 80% by weight, of component (C).

3) Resin composition comprising from about 10 to 90% by weight, particularly from 20 to 80% by weight, of component (A) and from about 10 to 90% by weight, particularly from 20 to 80% by weight, of component (D).

Resin compositions 1), 2) and 3) above may further comprises unmodified PPE or unmodified polymers or resins, as well as further additives, as described below.

Particular compounding ratios are selected from the above-specified ranges depending on performance properties required for the end use of the final products.

Component (A), terminal-modified PPE, may be used either alone or in combination with an unmodified PPE. Further, component (D), hydroxyl-containing olefin resin, may be used either alone or in combination with an unmodified olefin resin.

If desired, the resin compositions according to the present invention may further contain compounding additives, such as those commonly employed for saturated polyesters, e.g., antioxidants, weathering agents, plasticizers, fluidity improving agents, parting agents, and nucleating agents; those commonly employed for polyamides, e.g., antioxidants, weathering agents, nucleating agents, and flame retardants; and those commonly employed for olefins resins, e.g., antioxidants, weathering agents, nucleating agents, flame retardants, and slip agents.

If desired, the resin compositions of the present invention may furthermore contain compounding additives commonly employed for PPE resins, e.g., antioxidants, weathering agents, plasticizers, styrene resins, fluidity improving agents, and parting agents.

Addition of organic or inorganic fillers or reinforcements, particularly glass fibers, mica, talc, wollastonite, potassium titanate, calcium carbonate, and silica, is effective for improving rigidity, heat resistance, dimensional precision, and dimensional stability. Various colorants and dispersions thereof commonly employed in the art can also be added in favor of practical utility.

Addition of impact strength improving agents to resin compositions of the present invention comprising components (A) and (B) can be effective to obtain improved impact strength. Examples of effective impact strength improving agents include unsaturated epoxy compound-ethylene copolymers, unsaturated epoxy compound-ethylene-ethylenically unsaturated compound copolymers, styrene-butadiene copolymer rubbers and hydrogenation products thereof, ethylene polymers, an ethylenepropylene(-diene) copolymer rubbers, and such polymers modified with an α, β-unsaturated carboxylic acid anhydride or an unsaturated glycidyl ester or ether. Such impact strength improving agents may be used either individually or in combination of two or more thereof.

Similarly, examples of effective impact strength improving agents which can be added to resin compositions of the present invention comprising components (A) and (C), include styrene-butadiene copolymer rubbers and hydrogenation products thereof, ethylene-propylene(-diene) copolymer rubbers, and such polymers modified with α, β-unsaturated carboxylic acid anhydrides or unsaturated glycidyl esters or ethers, unsaturated epoxy compound-ethylene copolymers, and unsaturated epoxy compound-ethylene-ethylenically unsaturated compound copolymers. These impact strength improving agents may be used either individually or in combination of two or more thereof.

The amount of the impact strength improving agent to be compounded varies depending on desired physical properties and ranges as is known in the art, for example, from about 5 to 30 parts by weight per about 100 parts by weight of total resinous components of such compositions.

Addition of a rubber component to the resin compositions of the present invention comprising components (A) and (D) is particularly effective in improving impact strength. Examples of suitable rubber components for use in compositions of the present invention include styrene-butadiene copolymer rubbers and hydrogenation products thereof, and ethylene-propylene(diene) copolymer rubbers. The amount of rubber to be added varies depending on the desired physical properties and ranges as is known in the art, for example, from about 5 to 30 parts by weight per about 100 parts by weight of the total resinous components of such compositions.

Resin compositions of the present invention can be prepared by mixing the above-described components by kneading in various kneading machines (e.g., a single-screw extruder, a twin-screw extruder, a Banbury mixer, and the like), or by mixing solutions or suspensions of each component and removing the solvent (or adding a common non-solvent) to form a precipitate, followed by collection by filtration. The components are mixed in any of known allowable orders. Where a melt-kneading method is used, components are preferably mixed successively in descending order of viscosity of each component added.

The present invention is now illustrated in greater detail with reference to Examples, but it should be understood that the present invention is not deemed to be limited thereto. All the parts, percents, and ratios are by weight unless otherwise indicated.

PPE used in the following Examples was poly(2,6-dimethyl-1,4-phenylene ether) having an intrinsic viscosity of about 0.3 dl/g as measured in chloroform at 30° C. (product of Nippon Polyether K.K.).

The rate of reaction of the terminal phenolic hydroxyl group of PPE was calculated from the amount of the terminal phenolic hydroxyl group either before and after the reaction in accordance with known methods, e.g., as described in the *Journal of Applied Polymer Science; Applied Polymer Symposium*, Vol. 34, pp. 103–117 (1978).

EXAMPLES 1 TO 4

PPE and toluene were charged in a reactor in the amounts shown in Table 1 below. The mixture was heated under stirring to dissolve the PPE. After the heating temperature reached the temperature shown in Table 1, sodium ethoxide (dissolved in ethanol) was added to the solution, and a predetermined amount of the modifying agent shown in Table 1 was then added thereto, followed by heating with stirring to conduct the reaction.

After completion of the reaction, the reaction mixture was poured into 1 l of acetonitrile. The thus formed precipitate was collected by filtration, washed with 1 l of acetonitrile, and dried at 80° C. under reduced pressure to obtain a terminal-modified PPE. The reaction results are shown in Table 1.

Figure 1:
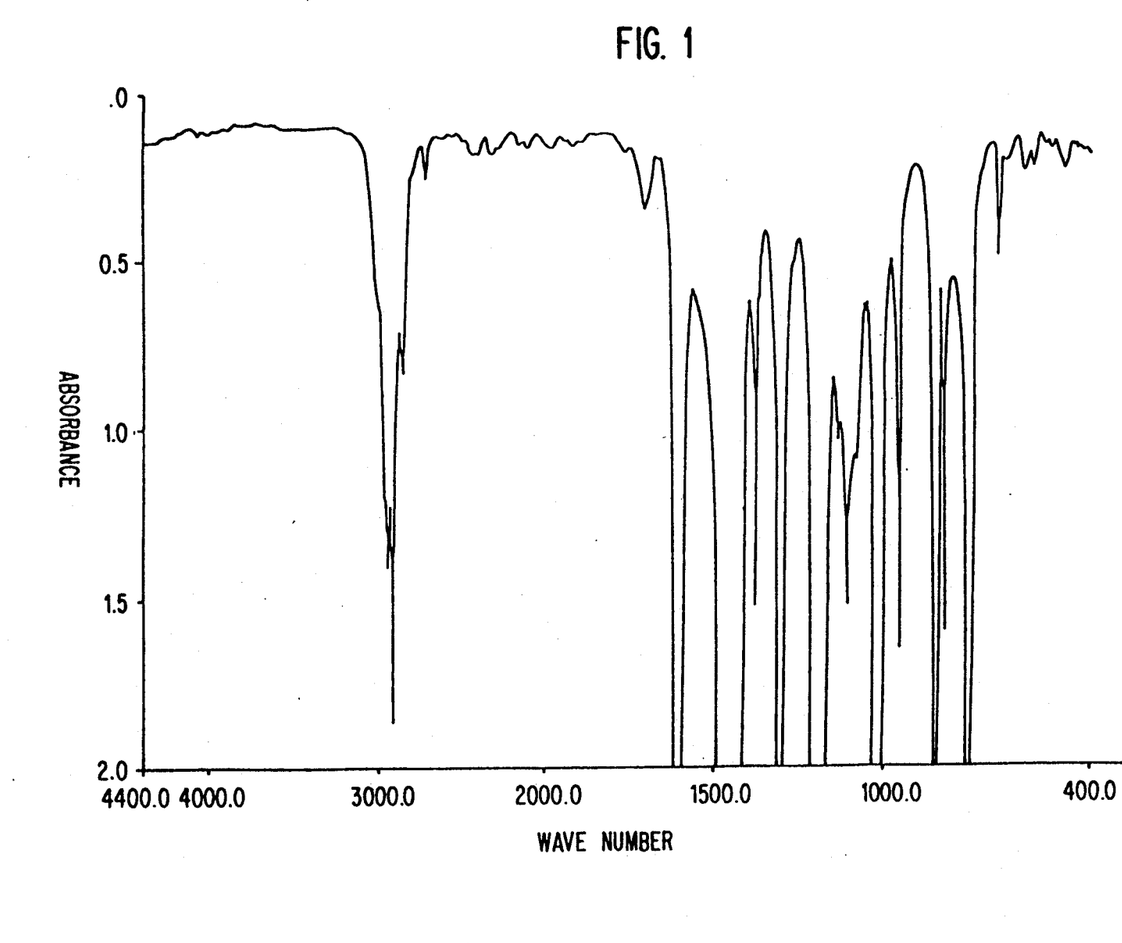
FIG. 1 is an infrared absorption spectrum of a cast film prepared from a chloroform solution of the terminal-modified PPE obtained in Example 1.

The infrared absorption spectrum of a cast film prepared from a chloroform solution of the terminal-modified PPE obtained in Example 1 is shown in FIG. 1, in which an absorption assigned to an alkoxysilyl group was observed in the vicinity of 1090 cm$^{-1}$.

TABLE 1

| Example No. | Modifying Agent Kind | Amount (g) | PPE (g) | EtONA (g) | Toluene (ml) | Reaction Temp. (°C.) | Reaction Time (hr) | Yield (%) | Rate of Reaction (%) |
|---|---|---|---|---|---|---|---|---|---|
| 1 | 3-(glycidyloxy)-propyltrimethoxy-silane | 10.0 | 20 | 0.3 | 200 | 104 | 3 | 100 | 97.6 |
| 2 | N-glycidyl-N,N-bis[3-(methyldi-methoxysilyl)-propyl]amine | 20.0 | 20 | 0.3 | 200 | 98 | 7 | 95.5 | 94.6 |
| 3 | 3-(glycidyloxy)-propyl(methyl)-dimethoxysilane | 12.6 | 20 | 0.3 | 200 | 98 | 7 | 100 | 95.9 |
| 4 | N-glycidyl-N,N-bis[3-(tri-methoxysilyl)- | 20.0 | 20 | 0.3 | 200 | 92 | 7 | 100 | 73.4 |

TABLE 1-continued

| Example No. | Modifying Agent | | PPE (g) | EtONA (g) | Toluene (ml) | Reaction Temp. (°C.) | Reaction Time (hr) | Yield (%) | Rate of Reaction (%) |
| --- | --- | --- | --- | --- | --- | --- | --- | --- | --- |
| | Kind | Amount (g) | | | | | | | |
| | propyl]amine | | | | | | | | |

APPLICATION EXAMPLE 1

In 100 ml of xylene were dissolved 5 g of the terminal-modified PPE obtained in Example 1 and 3 g of maleic anhydride-grafted polypropylene (number average molecular weight (hereinafter abbreviated as Mn): 43,200; weight average molecular weight (hereinafter abbreviated as Mw): 125,000; maleic anhydride content: 1.34%), and the solution was heat-refluxed at 130° C. in a nitrogen atmosphere.

After completion of the reaction, the reaction mixture was poured into 1 l of methanol, and the precipitated polymer was collected by filtration, washed with 1 l of methanol, and dried at 80° C. under reduced pressure to obtain 7.99 g of a polymer.

A 2.54 g portion of the resulting polymer was subjected to Soxhlet extraction using 200 ml of chloroform as a solvent to remove any unreacted PPE. The amount of recovered unreacted PPE was 1.30 g, indicating that the resulting polyphenylene ether-polypropylene copolymer had a polyphenylene ether content of 23.2%.

APPLICATION EXAMPLE 2

In 100 ml of xylene was dissolved 5 g of the terminal-modified PPE obtained in Example 1, and 0.1 g of di-n-butyltin dilaurate as a catalyst was added to the solution, followed by heating at 130° C. for 7 hours with stirring in a nitrogen atmosphere.

After completion of the reaction, the reaction mixture was poured into 1 l of methanol, and the precipitated PPE was collected by filtration and dried at 80° C. under reduced pressure to obtain 4.68 g of PPE.

As a result of gel-permeation chromatography, it was found that Mn and Mw of the PPE before the reaction were 14,200 and 37,000, respectively, on polystyrene conversion, and the Mn and Mw of the PPE after the reaction were 18,000 and 51,500, respectively, indicating achievement of increased molecular weight of PPE.

EXAMPLE 5

In a reactor were charged 20.0 g of PPE and 200 ml of N-methyl-2-pyrrolidone, and the PPE was dissolved by heating at 80° C. with stirring. Then, 3.5 g of sodium exthoxide was added thereto as a basic catalyst. After the temperature was elevated at 100° C., 10.5 g of 3-chloropropyl(methyl)diethoxy-silane was added dropwise to the reaction mixture over 15 minutes, followed by heating for 7 hours with stirring. The reaction mixture was poured into 1.5 l of methanol, and the precipitated, modified resin was collected by filtration, washed twice with 1 l portions of methanol, and dried at 80° C. under reduced pressure to obtain an alkoxysilylated PPE in a yield of 100%. The reaction rate was 95.1%.

Figure 2:
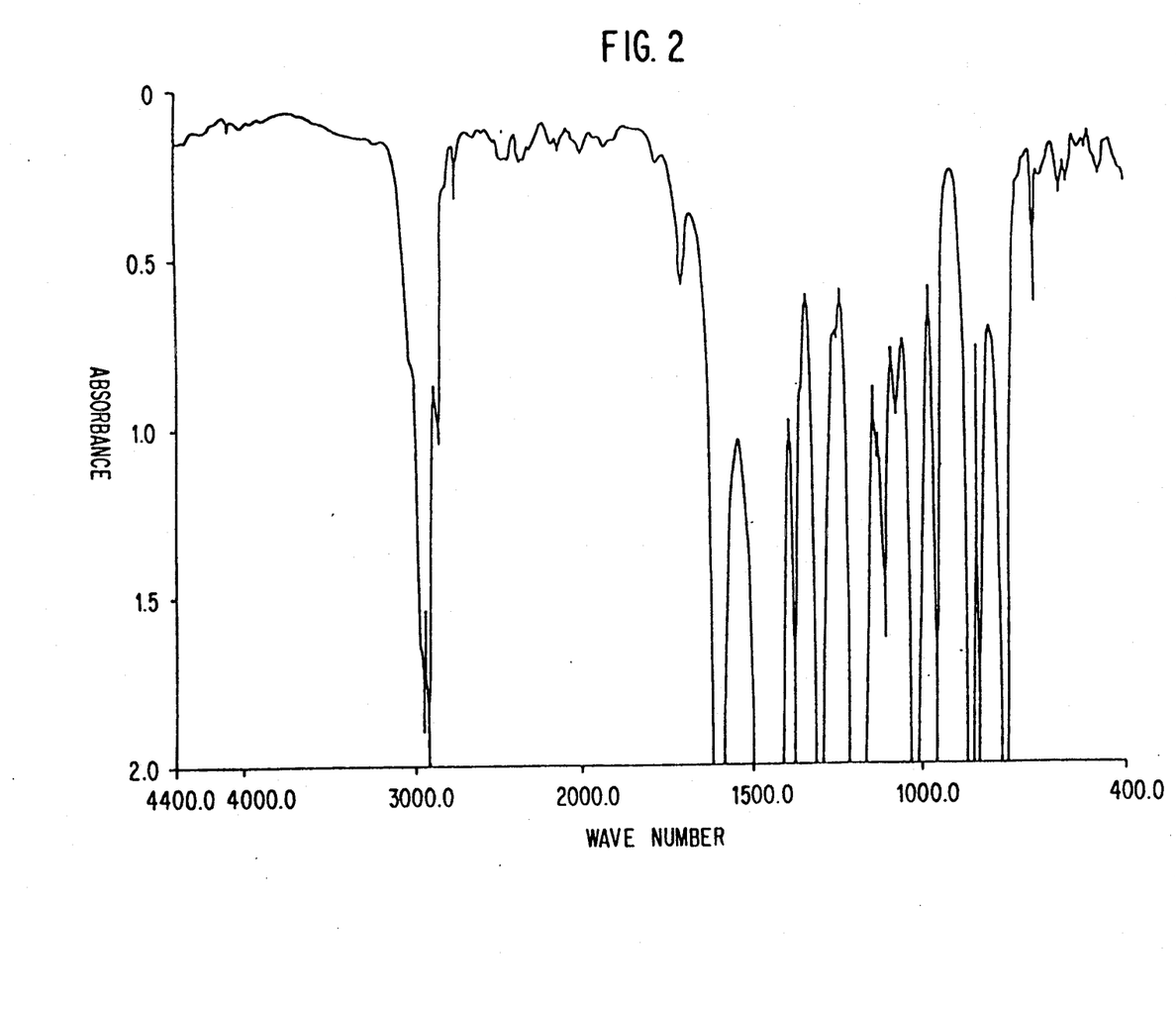
FIG. 2 is an infrared absorption spectrum of a cast film prepared from a chloroform solution of the alkoxysilylated PPE obtained in Example 5.

The infrared absorption spectrum of a cast film prepared from a chloroform solution of the resulting alkoxysilylated PPE is shown in FIG. 2. An absorption assigned to an alkoxysilyl group was observed in the vicinity of 1090 cm$^{-1}$.

EXAMPLE 6

An alkoxysilylated PPE was produced in the same manner as in Example 5, except for replacing sodium ethoxide with 6.0 g of triethylamine. The yield was 98.1%, and the reaction rate was 47.2%.

EXAMPLE 7

An alkoxysilylated PPE was produced in the same manner as in Example 5, except for replacing sodium ethoxide with 8.0 g of DBU and carrying out the reaction at 103° C. for 5 hours. The yield was 99.4%, and the reaction rate was 83.5%.

EXAMPLE 8

In a reactor were charged 20.0 g of PPE and 200 ml of toluene, and the mixture was heated at 80° C. with stirring to dissolve PPE. After 1.5 g of sodium ethoxide as a basic catalyst was added to the solution, the reaction mixture was heated at 100° C., and 4.5 g of 3-chloropropyltrimethoxysilane was added dropwise thereto over 15 minutes, followed by heating at 100° C. for 6 hours while stirring. The reaction mixture was poured into 1.5 l of methanol, and the reciprocated, modified resin was collected by filtration, washed twice with 1 l portions of methanol and dried at 80° C. under reduced pressure to obtain an alkoxysilylated PPE in a yield of 99.8%. The reaction rate was 60.0%.

APPLICATION EXAMPLE 3

In 100 ml of xylene were dissolved 3.0 g of the alkoxy-silylated PPE obtained in Example 7 and 3.0 g of hydroxylated polyproylene (Mn: 62,000; Mw: 450,000; hydroxyl group content: 0.5%), and 0.1 g of p-toluenesulfonic acid was added thereto, followed by heating at reflux for 7 hours in a nitrogen atmosphere.

After completion of the reaction, the reaction mixture was poured into 1 l of methanol, and the formed precipitated was collected by filtration, washed with 1 l of methanol, and dried at 80° C. under reduced pressure to recover 5.84 g of a polymer.

A 1.60 g portion of the resulting polymer was extracted from 200 ml of chloroform for 7 hours in a Soxhlet reactor to remove any ungrafted PPE. As a result, the amount of recovered, ungrafted PPE was 0.58 g, indicating that the grafted polymer had a PPE content of 21.6%.

EXAMPLES 9 TO 14 AND COMPARATIVE EXAMPLE 1

Preparation of Terminal-Modified PPE

PPE and toluene were charged in a reactor in amounts shown in Table 2 below. The mixture was heated under stirring to dissolve the PPE. After heating and the temperature reached the temperature shown in Table 2, sodium ethoxide dissolved in ethanol was added thereto, and a predetermined amount of a modifying agent, as shown in Table 2, was then added thereto, followed by heating with stirring to conduct the reaction.

After completion of the reaction, the reaction mixture was poured into 25 l of acetonitrile. The thus formed precipitate was collected by filtration, washed with 25 l of acetonitrile and dried by at 80° C. under reduced pressure to obtain terminal-modified PPE (a) or (b). The reaction results are shown in Table 2.

The solution was poured into a large amount of chloroform and a resulting insoluble matter was separated by filtration and dried. An amount of PPE in the insoluble matter is considered to correspond to that of PPE grafted on the resin composition. Accordingly, a degree of modification was calculated as a percentage of the

TABLE 2

| Terminal-Modified PPE | Modified Agent | | | | Reaction Temp. (°C.) | Reaction Time (hr) | Yield (%) | Rate of Reaction (%) |
|---|---|---|---|---|---|---|---|---|
| | Kind | Amount (g) | PPE* (g) | EtONa (g) | Toluene (l) | | | |
| (a) | 3-(glycidyloxy)-propyltrimethoxy-silane | 250 | 500 | 7.5 | 5 | 100 | 7 | 100 | 98 |
| (b) | N-glycidyl-N,N-bis[3-(methyl-dimethoxysilyl)-propyl]amine | 500 | 500 | 7.5 | 5 | 98 | 7 | 96.3 | 95.5 |

Note: *Polyphenylene ether produced by Nippon Polyether K.K. (intrinsic viscosity: 0.3 dl/g, chloroform, 30° C.)

Terminal-modified PPE (a) or (b) or unmodified PPE (product of Nippon Polyether K.K.; intrinsic viscosity: 0.3 dl/g in chloroform at 30° C.) and a saturated polyester (polybutylene terephthalate "Novadol 5010" produced by Mitsubishi Kasei Corporation) were melt-kneaded at a compounding ratio as shown in Table 3 below, in a 60 cc-volume Plastomill manufactured by Toyo Seiki K.K. at 260° C. and 60 rpm for 6 minutes. The resulting resin composition was evaluated according to the following test methods. The results obtained are shown in Table 3.

1) Dispersion State

The two-phase dispersion state of the composition was observed under a scanning electron microscope S-2400 manufactured by Hitachi, Ltd.

2) Flexural Modulus

A flexural modulus was measured on a 25 mm wide and 80 mm long specimen by means of an Instron tester according to JIS K7203. Measurements at 80° C. were made after conditioning the specimen, a sample holder, and a loading wedge in a warm-air type thermostat at 80° C.±1° C. for at least 20 minutes.

3) Degree of Modification

A part of the obtained resin composition was subjected to sampling and dissolved in a mixture of o-chlorophenol and tetrachloroethylene (3:2 by volume).

amount of PPE in the insoluble matter based on an amount of polybutylene terephthalate used. Furthermore, the above chloroform solution was poured into a large amount of methanol and a precipitated resin was collected and dried. The resulting resin was analyzed by an infrared spectroscopic analysis.

4) Izod Impact Strength

Unnotched Izod impact strength was measured on three thicknesses of a 2 mm thick specimen obtained by press molding of the resin composition at 280° C. in accordance with JIS K7110.

5) Appearance of Molded Article

The resin composition was injection molded to prepare a 47 mm long, 5.3 mm wide and 2.6 mm thick specimen, and appearance, mainly delamination, of the specimen was observed and evaluated as follows.
  Good . . . No problem for practical use.
  Medium . . . Improvement is needed for practical use.
  Bad . . . Extremely poor for practical use.

6) Solvent Resistance

A 31.5 mm long, 6.2 mm wide and 3.2 mm thick injection-molded specimen was soaked in toluene for 5 minutes. After the specimen was taken out, any change in appearance was observed with eyes.

TABLE 3

| | Example No. 9 | Example No. 10 | Example No. 11 | Example No. 12 | Example No. 13 | Example No. 14 | Compar. Example No. 1 |
|---|---|---|---|---|---|---|---|
| Composition (part): | | | | | | | |
| Terminal-modified PPE (a) | 20 | — | 50 | — | 80 | — | — |
| Terminal-modified PPE (b) | — | 20 | — | 50 | — | 80 | — |
| Saturated polyester | 80 | 80 | 50 | 50 | 20 | 20 | 50 |
| Unmodified PPE | — | — | — | — | — | — | 50 |
| Test Results: | | | | | | | |
| Dispersion State: | | | | | | | |
| Diameter of PPE particles (μm) | ≦1 | ≦1 | 0.1–3 | 0.1–3 | — | — | ≧500 |
| Shape of PPE particles | spherical | spherical | spherical | spherical | — | — | indeterminate |
| Degree of modification (%) | 7.1 | 6.6 | 8.6 | 7.2 | 5.8 | 5.4 | 0 |
| Appearance | good | good | good | good | good | good | bad |
| Solvent resistance | no change | no change | no change | no change | roughening of surface | roughening of surface | roughening of surface |
| Izod impact strength (kg · cm/cm²) | 29 | 27 | 13.0 | 11.5 | 8.8 | 7.9 | 5.1 |

As is apparent from the results in Table 3, the compositions comprising the terminal-modified PPE according to the present invention and a saturated polyester exhibited fine dispersion of PPE particles having a nearly spherical form. A graft copolymerized PPE was also found in these compositions.

EXAMPLES 15 TO 20 AND COMPARATIVE EXAMPLE 2

Terminal-modified PPE (a) or (b) obtained in Example 9 or unmodified PPE (product of Nippon Polyether K.K.; intrinsic viscosity: 0.3 dl/g in chloroform at 30° C.) and a polyamide (polyamide-6 "Ultramid KR 4411" produced by BASF) were melt-kneaded at a compounding ratio shown in Table 4 below in a 60 cc-volume Plastomill manufactured by Toyo Seiki K.K. at 280° C. and 60 rpm for 6 minutes. The resulting resin composition was press molded at 280° C. to prepare a 2 mm thick sheet. The resin composition was evaluated in the same manner as in Example 9. The results obtained are shown in Table 4.

0.9% as determined by infrared spectroscopic analysis. The MFR of the resin was 17.4 g/10 min. The resulting resin was designated hydroxyl-containing olefin resin (1).

PREPARATION EXAMPLE 2

Preparation of Hydroxyl-Containing Olefin Resin (2)

A modified olefin resin was prepared in the same manner as in Preparation Example 1, except for replacing propylene homopolymer with a propylene-7-methyl-1,6-octadiene copolymer (7-methyl-1,6-octadiene content: 2.7 mol %; degree of crystallinity: 45% as measured by X-ray diffractometry; MFR: 1.7 g/10 min) and changing the amount of benzoyl peroxide to 12.5 g. The resulting resin was designated hydroxyl-containing olefin resin (2). This resin had a 2-hydroxyethyl methacrylate content of 1.2% (determined in the same manner as in Preparation Example 1) and an MFR of 4.1 g/10 min.

PREPARATION EXAMPLE 3

TABLE 4

|  | Example No. 15 | Example No. 16 | Example No. 17 | Example No. 18 | Example No. 19 | Example No. 20 | Compar. Example No. 2 |
|---|---|---|---|---|---|---|---|
| Composition (part): | | | | | | | |
| Terminal-modified PPE (a) | 20 | — | 50 | — | 80 | — | — |
| Terminal-modified PPE (b) | — | 20 | — | 50 | — | 80 | — |
| Polyamide | 80 | 80 | 50 | 50 | 20 | 20 | 50 |
| Unmodified PPE | — | — | — | — | — | — | 50 |
| Test Results: | | | | | | | |
| Dispersion Stage: | | | | | | | |
| Diameter of PPE particles ($\mu$m) | $\leq 1$ | $\leq 1$ | $\leq 3$ | $\leq 3$ | — | — | 5–20 |
| Shape of PPE particles | spherical | spherical | spherical | spherical | — | — | spherical |
| Flexural modulus (kg/cm$^2$): | | | | | | | |
| at 23° C. | 23100 | 23000 | 22600 | 21900 | 24200 | 24100 | 20900 |
| at 80° C. | 3800 | 3900 | 9200 | 9000 | 12500 | 12500 | 8900 |
| Izod impact strength (kg · cm/cm$^2$) | 52 | 46 | 35.9 | 32 | 14 | 13 | 12.4 |
| Appearance | good | good | good | good | good | good | bad |

As is apparent from the results in Table 4, the resin compositions comprising the terminal-modified PPE of the present invention and a polyamide exhibited fine and uniform dispersion of PPE particles having a nearly spherical form and also had high impact strength and high high-temperature flexural modulus.

PREPARATION EXAMPLE 1

Preparation of Hydroxyl-Containing Olefin Resin (1)

In a 10 l glass-made flask having been equipped with a stirrer, whose atmosphere had been thoroughly displaced with nitrogen were charged 250 g of a propylene homopolymer powder (melt flow rate (MFR): 1 g/10 min as measured according to ASTM D1238) and 75 g of 2-hydroxyethyl methacrylate, and 5 l of chlorobenzene was added thereto, followed by heating at 130° C. with stirring to completely dissolve. The temperature was decreased to 110° C., and 20 g of benzoyl peroxide dissolved in 500 ml of chlorobenzene was added thereto dropwise over 2 hours. After the dropwise addition, the mixture was allowed to react at 110° C. for 3 hours. The reaction mixture was poured into 15 l of acetone, and the precipitated product was collected by filtration. Acetone washing and filtration were repeated two more times, and the product was finally dried under reduced pressure. The thus obtained graft-modified resin was found to have a 2-hydroxyethyl methacrylate content of Preparation of Hydroxyl-Containing Olefin Resin (3)

A modified olefin resin was prepared in the same manner as in Preparation Example 2, except for changing the amount of benzoyl peroxide to 40 g. The resulting resin (designated hydroxyl-containing olefin resin (3)) had a 2-hydroxyethyl methacrylate content of 3.2% (measured in the same manner as in Preparation Example 1) and an MFR of 1.8 g/10 min.

PREPARATION EXAMPLE 4

Preparation of Terminal-Modified PPE (1) and (2)

PPE and toluene were charged in a reactor in amounts shown in Table 5 below, and PPE was dissolved by heating with stirring. After the solution was heated up to the temperature shown in Table 5, sodium ethoxide dissolved in ethanol was added thereto, and a predetermined amount of the modifying agent shown in Table 5 was then added thereto, followed by heating with stirring to conduct reaction. After completion of the reaction, the reaction mixture was poured into 25 l of acetonitrile, and the precipitated terminal-modified PPE was collected by filtration, washed with 25 l of acetonitrile, and dried at 80° C. under reduced pressure. The resulting resin was designated terminal-modified PPE (1) or (2). The reaction results are shown in Table 5.

TABLE 5

| Terminal-Modified PPE | Modified Agent Kind | Amount (g) | PPE* (g) | EtONa (g) | Toluene (l) | Reaction Temp. (°C.) | Reaction Time (hr) | Yield (%) | Rate of Reaction (%) |
| --- | --- | --- | --- | --- | --- | --- | --- | --- | --- |
| (1) | 3-(glycidyloxy)-propyltrimethoxy-silane | 250 | 500 | 7.5 | 5 | 100 | 7 | 100 | 98 |
| (2) | 3-glycidyloxy-propyl(methyl)-dimethoxysilane | 250 | 500 | 7.5 | 5 | 100 | 7 | 100 | 97 |

Note: *PPE produced by Nippon Polyether K.K. (intrinsic viscosity: 0.3 dl/g, chloroform, 30° C.)

EXAMPLES 17 TO 21 AND COMPARATIVE EXAMPLES 3 TO 5

Terminal-modified PPE (1) or (2) as prepared in Preparation Example 4 or an unmodified PPE (product of Nippon Polyether K.K.; intrinsic viscosity: 0.3 dl/g at 30° C. in chloroform) and hydroxyl-containing olefin resin (1), (2) or (3) as prepared in Preparation Examples 1, 2 or 3 or an unmodified olefin resin (propylene resin MA3 produced by Mitsubishi Petrochemical Co., Ltd.; MFR: 10 g/10 min at 230° C. under a load of 2.16 kg) were melt-kneaded at a compounding ratio shown in Table 6 below in a 60 cc-volume Plastomill manufactured by Toyo Seiki K.K. at 280° C. and 60 rpm for 6 minutes. The resulting resin composition was evaluated in the same manner as in Example 9, except that organic solvent resistance was evaluated as follows. The results obtained are shown in Table 6.

7) Organic Solvent Resistance

Measurements were made according to Bergen's ¼ ellipse method (*SPE Journal*, 667 (1962)). That is, a 2 mm thick specimen was fixed to a quarter-elliptical (longer axis: 24 cm; shorter axis: 8 cm) holder and dipped in commercially available gasoline for 5 minutes. Samples were evaluated from the minimum strain which caused cracks as a limiting strain according to the following rating system:

Excellent . . . No crack was observed.
Good . . . Limiting strain: >1.5%
Medium . . . Limiting strain: 1.0–1.5%
Bad . . . Limiting strain: <1.0%

TABLE 6

|  | Example No. 17 | Example No. 18 | Example No. 19 | Example No. 20 | Example No. 21 | Compar. Example No. 3 | Compar. Example No. 4 | Compar. Example No. 5 |
| --- | --- | --- | --- | --- | --- | --- | --- | --- |
| Composition (part): |  |  |  |  |  |  |  |  |
| Terminal-modified PPE (1) | 50 | 50 | 50 | — | — | — | — | — |
| Terminal-modified PPE (2) | — | — | — | 50 | 50 | — | — | — |
| Hydroxyl-containing olefin resin (1) | 50 | — | — | — | — | 50 | — | — |
| Hydroxyl-containing olefin resin (2) | — | 50 | — | 50 | — | — | 50 | — |
| Hydroxyl-containing olefin resin (3) | — | — | 50 | — | 50 | — | — | — |
| Unmodified PPE | — | — | — | — | — | 50 | 50 | 50 |
| Unmodified olefin resin | — | — | — | — | — | — | — | 50 |
| Test Results: |  |  |  |  |  |  |  |  |
| Dispersion State: |  |  |  |  |  |  |  |  |
| Diameter of PPE particles (μm) | 1–5 | 1–3 | 1–3 | 1–5 | 1–10 | >100 | >100 | >100 |
| Shape of PPE particles | spherical | spherical | spherical | spherical | spherical | indeterminate | indeterminate | indeterminate |
| Izod impact strength (kg·cm/cm$^2$) | 4.4 | 8.4 | 7.7 | 10.1 | 8.1 | 3.1 | 3.5 | 3.4 |
| Organic solvent resistance | good | good | good | good | good | bad | bad | bad |

As can be seen from Table 6, the resin composition of the present invention which comprised the terminal-modified PPE and the hydroxyl-containing olefin resin exhibited very fine and uniform dispersion of PPE particles having a nearly spherical form and had high impact strength and satisfactory resistance to organic solvent.

EXAMPLES 22 TO 7 AND COMPARATIVE EXAMPLES 6 TO 7

3-Propyl(methyl)diethoxysilane-modified PPE obtained in Example 5 or an unmodified PPE (product of Nippon Polyether K.K.; intrinsic viscosity: 0.3 dl/g) and polybutylene terephthalate ("Novadol 5010" produced by Mitsubishi Kasei Corporation) or nylon-6 (product of BASF) were melt-kneaded at a compounding ratio shown in Table 7 below in a 60 cc-volume Plastomill manufactured by Toyo Seiki K.K. at 260° C. and 60 rpm for 6 minutes. The resulting resin composition was evaluated in the same manner as in Example 9. The results obtained are shown in Table 7.

TABLE 7

|  | Example No. 22 | Example No. 23 | Example No. 24 | Example No. 25 | Example No. 26 | Example No. 27 | Compar. Example No. 6 | Compar. Example No. 7 |
| --- | --- | --- | --- | --- | --- | --- | --- | --- |
| Composition (part): |  |  |  |  |  |  |  |  |
| Terminal-modified PPE | 20 | 20 | 50 | 50 | 70 | 70 | — | — |
| Nylon-6 | — | 80 | — | 50 | — | 30 | — | 50 |

TABLE 7-continued

|  | Example No. 22 | Example No. 23 | Example No. 24 | Example No. 25 | Example No. 26 | Example No. 27 | Compar. Example No. 6 | Compar. Example No. 7 |
|---|---|---|---|---|---|---|---|---|
| Polybutylene terephthalate | 80 | — | 50 | — | 30 | — | 50 | — |
| Unmodified PPE | — | — | — | — | — | — | 50 | 50 |
| Test Results: | | | | | | | | |
| Dispersion Stage: | | | | | | | | |
| Diameter of PPE particle (μm) | ≦0.5 | 0.3–1 | 0.5–1 | 0.5–2 | 1–10 | 0.1–3 (Ny-6 was dispersed) | >500 | 5–20 |
| Shape of PPE particles | spherical | spherical | spherical | spherical | indeterminate | spherical | indeterminate | spherical |
| Appearance | good | good | good | good | good | good | bad | bad |
| Solvent resistance | no change | no change | no change | no change | roughening of surface | roughening of surface | roughening of surface | roughening of surface |
| Izod impact strength (kg · cm/cm²) | 19.2 | 32.5 | 8.9 | 16.2 | 6.6 | 9.7 | 5.1 | 12.4 |

As described and demonstrated above, desired terminal-modified PPE can be easily produced by processes of the present invention. Such terminal-modified PPE's can easily be copolymerized with treated polypropylene as demonstrated in Application Example 3.

Thermoplastic resin compositions of the present invention, comprising terminal-modified PPE and a saturated polyester, exhibit excellent dispersion states in which both resins are copolymerized as demonstrated by the results shown in Table 3.

Thermoplastic resin compositions of the present invention, comprising terminal-modified PPE and a polyamide exhibit excellent dispersion states and high impact strength as demonstrated by the results shown in Table 4.

Thermoplastic resin compositions of the present invention, comprising terminal-modified PPE and a hydroxyl-containing olefin resin, exhibit markedly improved compatibility between these two resin components, showing excellent dispersion states with high mechanical strength and solvent resistance as demonstrated by the results of Table 6.

While the invention has been described in detail and with reference to specific examples thereof, it will be apparent to one skilled in the art that various changes and modifications can be made therein without departing from the spirit and scope thereof.

What is claimed is:

1. A process for producing a terminal-modified polyphenylene ether represented by formula (III):

(III)

wherein $Q^1$ represents a halogen atom, a primary or secondary alkyl group, a phenyl group, an aminoalkyl group, a hydrocarbon oxy group, or a halo-hydrocarbon oxy group; $Q^2$ represents a hydrogen atom, a halogen atom, a primary or secondary alkyl group, a phenyl group, a haloalkyl group, a hydrocarbon oxy group, or a halo-hydrocarbon oxy group; n represents an integer of at least 10; X represents an oxygen atom or a nitrogen atom; $R^1$ represents an alkylene group having from 1 to 12 carbon atoms; $R^2$ and $R^3$ each represents a hydrocarbon group having from 1 to 6 carbon atoms; s represents 1 when X is an oxygen atom, or 2 when X is a nitrogen atom; and t represents an integer of from 1 to 3, said process comprising reacting a polyphenylene ether represented by formula (I):

(I)

wherein $Q^1$, $Q^2$, and n are as defined above,
with a compound containing one alkoxysilyl group and one glycidyl group per molecule which is represented by formula (II):

(II)

wherein X, $R^1$, $R^2$, $R^3$, s, and t are as defined above, to produce said terminal modified polyphenylene ether.

2. A process as claimed in claim 1, wherein said polyphenylene ether represented by formula (I) is poly(2,6-dimethyl-1,4-phenylene ether).

3. A process as claimed in claim 1, wherein said compound represented by formula (II) is N-glycidyl-N,N-bis[3-(methyldimetnhoxysilyl)propyl]amine, N-glycidyl-N,N-bis[3-(trimethoxysilyl)propyl]amine, 3-glycidyloxypropyl(methyl)diethoxysilane, 3-glycidyloxypropyltrimethoxysilane, or 3-glycidyloxypropyl-(methyl)diethoxysilane.

4. A process as claimed in claim 1, comprising reacting from 2 to 50 mols of the compound represented by formula (II) per mol of the terminal phenolic hydroxyl group of the polyphenylene ether represented by formula (I) in an organic solvent in the presence of a basic catalyst.

5. A process as claimed in claim 4, wherein said organic solvent is an aromatic hydrocarbon.

6. A process as claimed in claim 4, wherein said basic catalyst is sodium methoxide, sodium ethoxide, benzyldimethylamine, triethylamine, tributylamine, 1,8-diazabicyclo[5,4,0]-7-undecene, sodium hydroxide or potassium hydroxide.

* * * * *